United States Patent [19]

Banks

[11] Patent Number: 4,950,884

[45] Date of Patent: Aug. 21, 1990

[54] ELECTRO-OPTIC MODULATOR AND MODULATION METHOD

[75] Inventor: Frank J. Banks, Leucadia, Calif.

[73] Assignee: Moog, Inc., East Aurora, N.Y.

[21] Appl. No.: 395,589

[22] Filed: Aug. 18, 1989

Related U.S. Application Data

[63] Continuation-in-part of Ser. No. 138,320, Dec. 28, 1987, abandoned.

[51] Int. Cl.⁵ ............................................. G02F 1/03
[52] U.S. Cl. .............................. 250/227.21; 350/389
[58] Field of Search ................. 250/227; 350/370, 374, 350/384, 389, 96.1, 96.2

[56] References Cited

U.S. PATENT DOCUMENTS

| | | | |
|---|---|---|---|
| 2,616,962 | 11/1952 | Jaffe | 350/389 |
| 3,346,319 | 10/1967 | Billings | 350/389 |
| 3,900,246 | 8/1975 | Kimura et al. | 350/389 |
| 4,421,383 | 12/1983 | Carlsen | 350/96.20 |
| 4,547,774 | 10/1985 | Gould | 350/96.20 |
| 4,554,449 | 11/1985 | Taniuchi et al. | 250/227 |

Primary Examiner—Vincent P. McGraw
Assistant Examiner—S. A. Turner
Attorney, Agent, or Firm—Frank D. Gilliam

[57] ABSTRACT

A device and method for modulating light intensity in response to a varying electrical signal which is particularly useful with optical fiber information sensing systems. The device includes a number of components positioned in seriatim in an elongated cavity in an insulating body. Means for receiving a light signal, such as from an optical fiber, is positioned at one end of the cavity. A lens receives the light and collimates it into a narrow collimated beam directed through the cavity. The beam is polarized, retarded by a wave plate to circular polarization and passed through a modulator material which is capable of rotating beam polarization in response to varying voltage signals imposed on the modulator through electrodes thereon. A mirror at the end of the modulator reflects the beam back through the system. The beam is further rotated by electro optic material as a function of applied voltage, then further retarded by said wave plate and then attenuated by said polarizer as a function of the applied voltage. The returning attenuated beam is then focused into the optical fiber.

9 Claims, 1 Drawing Sheet

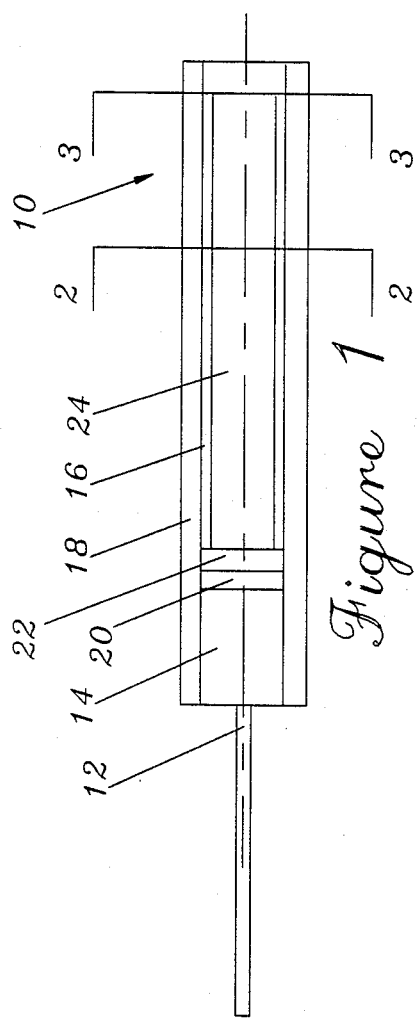
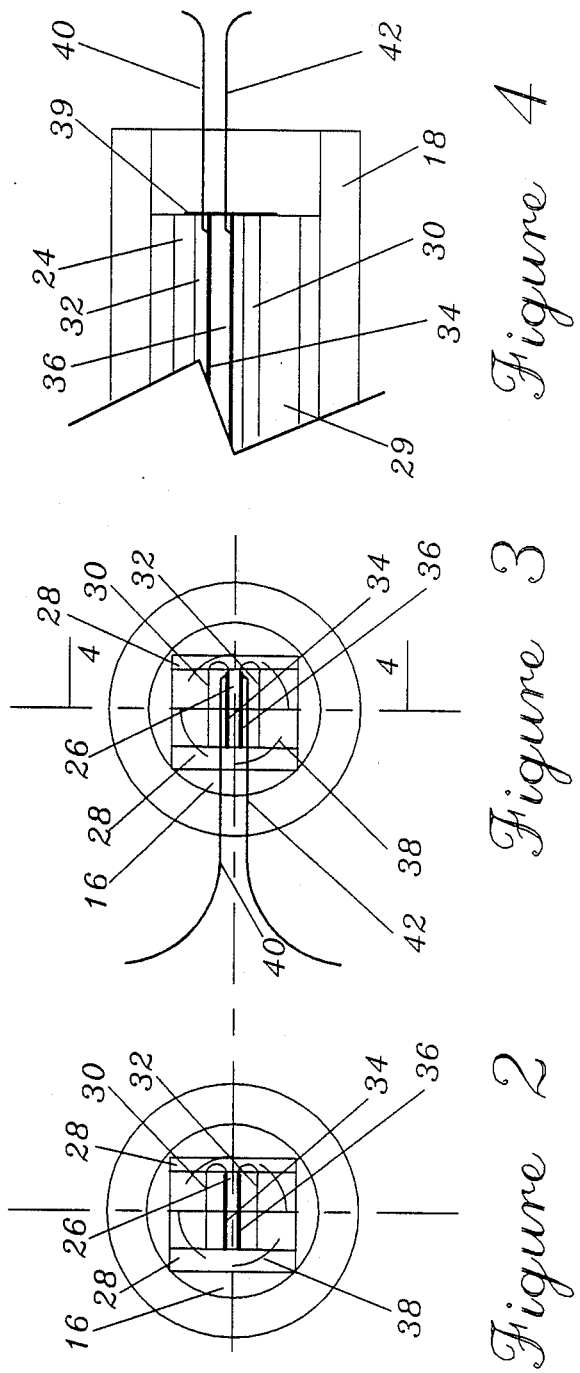

ELECTRO-OPTIC MODULATOR AND MODULATION METHOD

This is a continuation-in-part of copending application Ser. No. 07/138,320 filed on Dec. 28, 1987, and now abandoned.

BACKGROUND OF THE INVENTION

This invention relates in general to electro-optic modulators, and more specifically, to devices and methods for modulating a light beam in accordance with varying voltages which has increased sensitivity and is particularly adapted for use with optical fiber systems.

Over the years, systems have come into use which use electrical signals passing through wires from input means to sense information and return the information to a distant location for use. These systems are much lighter in weight, occupy little space and provide redundant wiring paths to protect against loss of contact if one wire is damaged. Unfortunately, these systems are subject to short circuits or other damage to the wires, electromagnetic interference (EMI) from nearby wiring or electrical devices and are potentially subject to destruction by electromagnetic pulses (EMP) from nuclear blasts or other sources. There is a particular need to overcome these problems in military aircraft, missiles and ships and in numerically controlled machine tools and robotics where EMI and EMP pose serious problems.

Recently, considerable interest has developed in using optical fiber systems for passing information rapidly and accurately from a remote sensor over long distances. Optical fiber systems have many advantages over the wired electricalcircuits EMI and EMP, short circuit potential and are lighter in weight which is very important for aerospace applications. Typical fiber optic control systems are disclosed by Sichling in U.S. Pat. No. 4,246,478 and Blackington in U.S. Pat. No.4,313,226.

Many specialized devices have been used in optical fiber systems for transducing electrical or mechanical position or quantity signals into a proportional light signal suitable for transmission through a fiber. Typical of these are the systems disclosed by Walker in U.S. Pat. No. 4,454,418 and Lockett et al. in U.S. Pat. No. 4,479,264. In many cases it is necessary to transmit light from a friendly environment (e.g., low temperature with no electro magnetic interference such as an aircraft electronics bay) to a hostile environment (e.g., flight controls, engine controls) encode data by modulating the light beam with an electrical signal, and returning the modulated light back to the friendly environment for translation and use. A number of such electro-optic modulators are in use, such as those described by R. A. Becker in his paper, "Broad-Band Guided-Wave Electro-optic Modulators", IEEE Journal of Quantom Electronics, Vol. QE-20, No. 7, July 1984.

In order to obtain the desired light modulation signals in electro optic materials with minimum electrical power it is necessary to use very short, narrow electric field paths together with extended light paths within an electric field and within the electro-optic medium. Present modulators capture light emitted from an optical fiber, pass it through an electro-optic material, recapture the light and direct it into a second fiber for retransmission to the point of original transmission. This is cumbersome and inefficient, requiring dual fibers for each line.

In some modulators, very small electrodes are placed on the electro-optic material surface with very small spacing. This result in a high electric field over a short optical path. In other cases, electrodes are placed on each side of a very thin electro-optic material which results in a longer light path but spacing is still limited by the practical minimum thickness of the electro-optic material, again resulting in undesirably high voltage. Attempts have been made to overcome this problem by cutting shallow parallel grooves in the electro-optic material and placing electrodes in the grooves. Light is then passed through the material perpendicular to the electrodes. This results in closer electrode spacing, because the mechanical integrity of the material is such that the gap between the grooves can be very thin when compared to sheet material. However, the depth of the grooves and thus the light path length is limited by the structural strength of the material.

An electrical bias has been used to reduce the voltage required for optical attenuation. The required voltage is a sine squared function of light attenuation so that the required voltage change for a given amount of light attenuation is less at mid range as compared to voltage onset. I have found that an equivalent effect can be obtained with an optical bias created by circular polarization of the light or by straining the electro optic material to partially pre-rotate its polarization. An equivalent effect can also be created in bifregent electro optic material by "angular turning" the light beam with the materials principal axis.

Electrical bias is sometimes impractical if the modulator power supply is transmitted by light and converted to electric power by photodiode because of limited power and voltage which is practically available.

In addition to problems present electro-optic modulators have with high voltage requirements, electric bias, dual fibers for each information sensing circuit, requiring single mode fiber in lieu of multimode fibers, and undesirable large size and weight, many known modulators also include optics-to-air interfaces which are open to possible fogging or other contamination in a hostile environment which can reduce system efficiency or even render the system inoperative.

Thus, there is a continuing need for improved electro-optic information sensing systems and methods which are more efficient, lighter in weight, have lower voltage and power requirements can operate with multi-mode fibers and without electric bias, and reduce the possibility of interference or contamination by outside materials and forces.

SUMMARY OF THE INVENTION

The above-noted problems, and others, are overcome by my invention, which basically comprises a device and method for modulating light intensity in accordance with a varying electrical signal and which can receive constant amplitude light through an optical fiber, modulate the light and return the modulated light to the source through the same fiber. The device includes several components positioned within an elongated cavity in a supporting body. a lens at one end of the cavity is arranged to receive light from and end of an optical fiber held against the lens. the lens collimates the incoming light into a narrow collimated light beam. The beam is then polarized and partially retarded to circular polarization and passed through a modulating material to a mirror, which reflects the modulated light back through the cavity and back into the optical fiber.

The modulator materials is capable of rotating beam polarization in response to voltages between two electrodes which are on opposite sides of a thin rib of the modulator material running the entire length of the modulator thus reducing the voltage in proportion to its length and width. Since light passes through the modulator twice, the optical effect of the modulator will be double that in prior art single-pass modulators, effectively further doubling system efficiency. The required voltage is halved and the second or output set of polarizer and lens is eliminated. The returning beam is attenuated by the polarizer as a function of the beam rotation in the modulator, so that the light level returning into and through the fiber is a function of the voltage imposed on the electrodes.

In addition to electrical bias, either of two methods and devices may be used to retard the circular polarization of the light entering the modulator. A wave retardation plate may be placed between the polarizer and the modulator to provide partial wave retardation, which is further retarded by a factor of 2 upon returning through the system. Alternatively, the wave plate can be omitted and the same optical bias can be introduced by bending the body (usually a glass tube) slightly so as to induce a permanent strain into the modulating material. Since the relative thermal expansion and contraction of the body and the modulator are substantially identical, temperature changes will not induce significant changes in strain. In either case, with no voltage between the electrodes, circular polarization is retarded sufficiently to providing maximum voltage sensitivity. The optical bias can also be introduced by "angular turning" of the light beam from the principal axis of the principal light path in a bifregent electro optical material.

The system of this invention is primarily concerned with sensing information such as temperature, position, sound pressure, etc., and conveying the information to a remote observation location. The sensed information could be used by an operator to adjust operation at the source of the sensed information. Also, a variety of automatic, feed back, systems could be used to control operation of a device, such as a flight control element, or a manufacturing robot, in response to the information sensed.

BRIEF DESCRIPTION OF THE DRAWING

Details of the invention, and of a preferred embodiment thereof, will be further understood upon reference to the drawing, wherein:

FIG. 1 is a schematic elevation view of the electro-optic modulator of this invention with portions of the enclosing body cut-away to reveal internal components;

FIG. 2 is a vertical section view taken on line 2—2 in FIG. 1;

FIG. 3 is a right elevation view of the modulation material, detailing the electrode connections; and FIG. 4 is a detail view of the end region of the modulation material, as seen from the direction indicated at 4—4 in FIG. 3.

DETAILED DESCRIPTION OF THE INVENTION

Referring now to FIG. 1, there is seen a side elevation view of my electro-optical modulator assembly 10, partially cut-away to reveal internal components.

Light is directed into modulator assembly 10 through an optical fiber 12 which is in contact with a lens 14 in an elongated (usually cylindrical) cavity 16 through modulator assembly 10. Any conventional optical fiber may be used, and any suitable conventional coupling may be used to directly attach fiber 12 to lens 14. Body 18 within which cavity 16 is formed may be any suitable material. Generally, a material having a coefficient of thermal expansion substantially the same as the modulating material described below is preferred. In most cases a silica glass tube may be used.

Lens 14 may be made from any optical material in a configuration which will receive light emitted by fiber 12 and form it into a narrow collimated beam. Typically, lens 14 may be a cylindrical graded index optical glass lens.

A polarizer 20 is positioned in direct contact with lens 14 to receive the light beam therefrom and emit a polarized light beam. Any suitable polarizing material may be used. Typical materials include Glan polarizer 8612 from the Corning Advance Product Company, Corning NI 14831.

The polarized light beam then, in the illustrated embodiment, passes through a wave retarder 22 positioned in contact with polarizer 20, resulting in maximizing light attenuation to voltage ratio. Retarder 22 may be any suitable wave plate retarder, such as those available from Oriel 250 Long Beach Blvd., Stanford, Conn. 06497-0872 under the Model 27520 designation.

Next, the light beam passes into an elongated bar 24 comprising modulating material 26 and cover strip 18. Sensitivity and low voltage operation is enhanced both by greater length of modulating material 26 and closeness of spacing of the input electrodes. As detailed below, my invention substantially extends the length of the modulating material and provides for extremely close electrode spacing. Typical modulating materials and the use thereof are described by Homer Fay in his paper "Electro-Optic Modulation of Light propagating near the Optic Axis in LiNb03", Journal of the Optical Society of America, Vol. 59, No. 11,1399–1404, November 1969.

As best seen in FIG. 2–4, bar 24 has a cross-section, square or rectangular, which snugly fits within cavity 16. Modulating material has a pair of closely space, parallel, lengthwise grooves 30 and 32 forming a rib 29 therebetween having conductive electrodes 34 and 36 on the opposite rib sides. The area covered by the light beam passing through bar 24 is schematically indicated at 38, covering all of the material in rib 29 between electrodes 34 and 36.

Modulating material 26 and cover strip 28 may be formed from any electro optic material which will rotate polarization of light as a function of the voltage impressed across electrodes 34 and 36. Non-hydroscopic materials are preferred because of temperature and humidity limitations of otherwise suitable hygroscopic materials. Typical modulating materials include lithium niobate crystals (available from Union Carbide and Crystal Technology), potassium tantalate-niobate (available from Union Carbide), barium sodium-niobate (available from Union Carbide), and PbLaZrTi (PLZT) (available from Motorola.) Of these, best results have been obtained with PLZT which effectively modulate multi-mode light and which is, therefore, preferred. Cover strip 28 may be formed from the same material as modulating material 26, or any other suitable insulating material having the same coefficient of thermal expansion. Typically, cover strip 28 may be bonded to modulating material 26 by Master Bond EP30 Teaneck, N.J. 07666. The firmly attached cover strip adds considerably to the physical strength of thin rib 29.

Preferably, the input end (that nearest polarizer 20) of bar 24 is coated with a conventional antireflection coating to permit the maximum light transmission across that interface. The opposite end of bar 24 bears a reflector 39 (as seen in FIG. 4), either formed directly on the surface or bonded thereto. These coatings can be applied in any conventional manner, such as vacuum deposition.

Grooves 30 and 32 may be formed in any suitable manner, such as conventional machining. Electrodes 34 and 36 are separate electrodes which are plated or vacuum deposed in grooves 30 and 32 or may be formed in place. I prefer to provide conductive strips 34 and 36 by vacuum deposit of CrNi, which produces the best results.

As seen in FIGS. 3 and 4, cover strip 28 ends slightly short of the end of modulating material 26. This space allows wires 40 and 42 from the source of the varying voltage, the optical analog of which is to be transmitted to a remote location, to enter the assembly and connect to conductors 34 and 36, respectively.

In order to damp any external forces which might be transmitted to bar 24, I prefer to fill the space within cavity 22 around bar 24 with an optical gel, such as Nu-Sil optical gel, available from McGhan Nu Sil Corp, 1150 Mark Ave., Carpenteria, Calif. 93013, Med-6600.

In an alternate embodiment to that shown using wave plate retarder 22, that method of retarding the circular polarized light may omitted and a permanent strain may be induced in modulating material 26 thereby producing the required optical bias. Such a strain may be induced by heating and bending body 18 to induce a permanent strain into modulation material 26. If a bifregent electro optic material is used the bias may be attained by "angular tuning".

While the electro-optic modulator assembly of my invention may have any suitable size, generally it is preferred that the unit be as small as possible. Typically, body 18 may be a glass tube having a length of about 40 mm, outside diameter of about 4 mm and inside diameter of about 1 mm. Lens 14 may be a cylindrical lens having a diameter of about 1 mm and length of about 10 mm and the distance between parallel electrodes 26 and 28 is about 90 ( m) micro meters.

While certain preferred dimensions, materials, configurations and arrangements were detailed in the above description of preferred embodiments, those can be varied, where suitable, with similar results. Other components of the system in which my electro-optic modulator can be used are not described, since they are conventional. Other applications, variations and ramifications of this invention will occur to those skilled in the art upon reading this disclosure. Those are intended to be included within the scope of this invention as defined in the appended claims.

I claim:

1. An electro-optic modulator assembly which comprises:
   a body having an elongated cavity therethrough;
   means for holding an end of an optical fiber adjacent to a first end of said cavity;
   lens means within said first end of said cavity in contact with said fiber, said lens means adapted to collimate light received from said optic fiber into a narrow collimated beam and to direct that beam along said cavity;
   polarizing means adjacent to said lens to polarize said beam;
   retarding means to retard said polarized light beam;
   modulating means comprising an elongated electro optic material lying within said cavity, receiving said beam and rotating it polarization, said modulation means comprises an elongated bar of modulating material, two parallel spaced apart grooves extending substantially the entire length of said bar of electro-optic material forming a thin rib therebetween,
   conductive layers on the two opposite sides of said rib form electrodes therealong, means to connect a source of variable voltage to said electrodes, and
   a cover strip bonded to the grooved face of said modulating material covering said grooves.

2. The assembly according to claim 1 wherein said retarding means comprises a wave plate in said cavity between said polarizing means and modulating means to retard said beam polarization during each passage therethrough.

3. The assembly according to claim 1 wherein said retarding means comprises a strain induced in said electro optic material by permanently bending said body sufficiently to induce a permanent beam retardation.

4. The assembly according to claim 1 wherein all empty space within said body is filled with an optical gel.

5. The assembly according to claim 1 wherein said modulation means comprises $LiNbO_3$.

6. The assembly according to claim 1 wherein said retarding means comprises directing the light beam at a quarter wave angle to the natural optical axis of said birefringent modulating means thereby causing the birefringent of the modulating means to retard the light.

7. The assembly according to claim 1 wherein said retarding means comprises a strain induced in said electro optic material by permanently bending said body sufficiently to induce a permanent strain in said modulating means to cause a polarized beam retardation.

8. The assembly according to claim 1 wherein said retarding means provides angular tuning of the light beam relative to the principal axis of the bifregent electro optic material.

9. The invention as defined in claim 1 additionally comprising mirror means receiving said beam from said modulating means and reflecting said beam back through said cavity.

* * * * *